Patented Nov. 6, 1945

2,388,238

UNITED STATES PATENT OFFICE 2,388,238

PROCESS OF MAKING POLYMERIC ACETALS

Joseph Dahle, West Newton, Mass., assignor, by mesne assignments, to Pro-Phy-Lac-Tic Brush Company, Northampton, Mass., a corporation of Delaware No Drawing. Application September 30, 1942, Serial No. 460,279

4 Claims. (Cl. 260—73)

In a previous application, Serial No. 388,143, filed April 11, 1941, I have described a new method of treating hydroxylic base materials, such as polyvinyl alcohol, to render them water resistant or water insoluble, the procedure being essentially topochemical since the base material does not go into solution during the reaction. My present invention is an improvement on the invention of that application and provides a more rapid and effective treatment. In said previous application the solid hydroxylic base material, which will be referred to as polyvinyl alcohol, since that is the material on which I have based most of the development work, is treated with a bath composed of a monomeric acetal, for instance, methyl formal, and an aldehyde and a catalyst. The monomeric acetal, for instance, methyl formal, was made and isolated and the isolated formal used in making up the insolubilizing bath by mixing with an aldehyde and a catalyst.

My present invention is based upon the discovery that more rapid and more effective insolubilization is produced if the treating bath is composed of a mixture of the monomeric acetal employed, aldehyde, alcohol, catalyst and water by reaction, the aldehyde-alcohol molar ratio being greater than the theoretical ratio required for producing the monomeric acetal. This bath is made by reacting the aldehyde and alcohol in the desired ratios in the presence of a catalyst and no attempt made to separate the reaction products from the mixture. The bath thus contains not only the combined alcohol and aldehyde i. e. the monomeric acetal, the components of which have combined in the ratio of 1:2, but also quantities of uncombined aldehyde and alcohol. The molar proportions of the aldehyde to the alcohol in the mixture before reaction is, preferably, within the range of 1:1 and 1.5:1 of aldehyde to alcohol.

The aldehyde-alcohol molar ratio is a major factor in the rate and degree of the insolubilizing action. Thus, when the aldehyde and alcohol are present in about the exact theoretical proportions to form the acetal, namely, when the aldehyde-alcohol ratio is 1 to 2, the degree of the insolubilizing action is low, while a reaction bath having an aldehyde-alcohol ratio of upwards of 1 to 1 and 1.5 to 1 produces a much more rapid and complete reaction and has been found to be much more satisfactory and economical. When the aldehyde-alcohol ratio is more than 2 to 1 and paraformaldehyde is used as the aldehyde and isopropanol as the alcohol some of the solid aldehyde may remain suspended in the bath and adhere to the sheet producing unsatisfactory results.

When insolubilizing polyvinyl alcohol, I have obtained good results with a reaction bath formed by mixing proper proportions of paraformaldehyde and isopropanol and a catalyst, such as sulfuric acid. When the mixture is refluxed a clear solution is obtained. In the resulting reaction solution, the water content is due substantially to reaction between aldehyde and alcohol only and the concentration of aldehyde is high. Consequently, since the formal as well as the aldehyde, dissolved in the formal, are non-solvents for both polyvinyl alcohol and polyvinyl formal, and the water content is negligible in this case, the reaction bath possesses natural non-solvent characteristics.

In contrast to the method described in my prior application, the method of the present invention is characterized by a rapid rate of reaction and a high concentration of aldehyde in solution. The water produced by the acetalizing reaction is soluble in the reaction mixture and may exert a swelling action upon the base material. A base material may be used having a moisture content which is in equilibrium with prevailing atmospheric conditions. Consequently, drying of the base material is not essential.

In the practice of the invention other alcohols may be used in place of isopropanol, such as, methanol, n-propanol and butanol. The higher alcohols may be used but I prefer to employ alcohols containing three carbon atoms or less because they possess good water solubility. Any aldehyde may be used which is soluble in the mixture resulting from its reaction with the alcohol used as long as the reaction mixture is a non-solvent for the polyvinyl alcohol or its reaction product.

The invention will be illustrated further by the following specific examples.

Example 1

A reaction mixture was prepared by mixing isopropanol, paraformaldehyde and sulfuric acid in the proportion of 120 grams of isopropanol and 30 grams of paraformaldehyde. Polyvinyl alcohol sheeting, 0.002 in. thick, plasticized with 15% glycerine by weight was oven dried for one hour at 100° C. and reacted in the paraformaldehyde-isopropanol reaction mixture for one minute at 70° C. then purified, dried and analyzed. The molar aldehyde-alcohol ratio in the bath was 0.5 to 1 and the catalyst content was 0.7 grams per 100 cc. sample calculated as sulfuric acid.

The reacted sheeting showed 15.8% unreacted alcohol groups calculated as vinyl alcohol.

Example 2

Polyvinyl alcohol sheeting such as used in Example 1 was treated for one minute at 70° C. in a paraformaldehyde-isopropanol reaction mixture in which the molar aldehyde-alcohol ratio was 1.5 to 1, namely, in the proportion of 60 grams of isopropanol and 45 grams of paraformaldehyde. The reacted sheeting showed 4.8% unreacted alcohol groups calculated as vinyl alcohol. The catalyst content of this bath was 0.9 grams per 100 cc. calculated as vinyl alcohol.

Example 3

Polyvinyl alcohol powder, screened through an 80 mesh sieve and dried in an oven overnight at 60° C., was reacted while stirring for seven minutes at 70° C. in an isopropanolparaformaldehyde bath containing sulfuric acid as a catalyst. The bath was prepared by reacting, until a clear solution was obtained, 1.5 moles of paraformaldehyde (45 grams) in one mole of isopropanol (60 grams) in the presence of one per cent of sulfuric acid by weight on the total constituents. In the insolubilizing reaction 60 grams polyvinyl alcohol and 1250 grams of bath were used.

The reaction product, after purification and drying, was a fine powder showing 9.7% unreacted alcohol groups calculated as vinyl alcohol. It could be molded at approximately 175° C. yielding a transparent, very tough chip.

Example 4

Two samples of powdered polyvinyl alcohol dried at 60° C. overnight were reacted in paraformaldehyde-methanol baths for two hours at 45° C. while stirring. The baths were prepared by mixing paraformaldehyde 0.5 mole (15 grams) in one case and 1.0 mole (30 grams) in the other with 1 mole methanol (32 grams) and reacted in the presence of one per cent of sulfuric acid by weight until clear solutions were obtained, using these solutions as insolubilizing baths.

The reaction products were white powders insoluble in boiling water although highly water susceptible showing 68.2% and 52.2% respectively of unreacted hydroxyl groups calculated as vinyl alcohol.

Example 5

Two samples of polyvinyl alcohol sheeting, 0.002 in. thick, containing 15% glycerin as plasticizer were dried for one hour at 100° C. and then reacted for two hours at 70° C. in paraformaldehyde-butanol baths. These baths were prepared by reacting in one case 0.5 mole of paraformaldehyde (15 grams) with one mole of butanol (74 grams) and 1.5 moles of paraformaldehyde (45 grams) with one mole of butanol (74 grams) in the other, in the presence of one per cent of sulfuric acid by weight until the paraform had dissolved. Two phase systems formed. In each case the top layer was used as the insolubilizing bath.

The reacted sheetings were insoluble in boiling water and showed 44.9% and 29.5% unreacted alcohol groups calculated as vinyl alcohol for the samples reacted in the baths having a 0.5 to 1 molar aldehyde-alcohol ratio and a 1.5 to 1 ratio respectively.

Example 6

Two samples of powdered polyvinyl alcohol were treated as in Example 4 except that the baths contained also 2 moles of anhydrous sodium sulfate. The reaction products showed 39.5% and 15.8% unreacted alcohol groups calculated as vinyl alcohol.

My present invention is of commercial importance because the rate of reaction is so high that it is practical to practice the invention as a continuous process in which a continuous ribbon of material passes through the solubilizing bath. Furthermore, the process does away with the necessity of reducing the moisture content below that of sheet stored under normal atmospheric conditions. During the passage of the sheet or ribbon through the bath a certain amount of water is produced as a result of the reaction and the ratio of aldehyde to alcohol tends to drop due to the reaction with the polyvinyl alcohol. It is possible to maintain the bath within desired limits of strength by periodically or continuously removing portions of the bath which can be freed from water by treatment with sodium sulphate or the like and returned to the original bath with the addition of and reaction with paraformaldehyde. The catalyst (preferably sulphuric acid) also is exhausted and can be restored as required. By the term "propanol" in the appended claims, I intend to include normal propanol and isopropanol.

I claim:

1. The method of insolubilizing a solid polyvinyl alcohol which comprises reacting a mixture of an alkyl alcohol having not more than four carbon atoms, an aldehyde and an acetalization catalyst in which the molar proportions of aldehyde to alcohol are within the range of about 1:1 and 1.5:1, said reaction mixture being a solvent for the aldehyde, and treating the solid polyvinyl alcohol in the reaction mixture thus produced, the polyvinyl alcohol and the final product being in the solid state throughout the reaction.

2. The method of insolubilizing a solid polyvinyl alcohol which comprises reacting a mixture of paraformaldehyde, propanol and an acetalization catalyst in which the molar porportions of aldehyde and alcohol are within the range of about 1:1 and 1.5:1, and treating the solid polyvinyl alcohol in the reaction mixture thus produced which is a non-solvent for the solid polyvinyl alcohol and the final product.

3. The method of insolubilizing a solid polyvinyl alcohol which comprises reacting a mixture of isopropanol paraformaldehyde and an acetalization catalyst in which the molar proportions of aldehyde to alcohol are within the range of about 1:1 and 1.5:1, and treating the solid polyvinyl alcohol in the reaction mixture thus produced, the polyvinyl alcohol and the final product being in the solid state throughout the reaction.

4. The method of insolubilizing a solid polyvinyl alcohol which comprises reacting a mixture of isopropanol paraformaldehyde and sulfuric acid in which the molar proportions of aldehyde to alcohol are within the range of about 1:1 and 1.5:1, and treating the solid polyvinyl alcohol in the reaction mixture thus produced, the polyvinyl alcohol and the final product being in the solid state throughout the reaction.

JOSEPH DAHLE.